US011389968B2

(12) United States Patent
Kuppuswamy et al.

(10) Patent No.: US 11,389,968 B2
(45) Date of Patent: Jul. 19, 2022

(54) SYSTEMS AND METHODS FOR DETERMINING POSE OF OBJECTS HELD BY FLEXIBLE END EFFECTORS

(71) Applicant: TOYOTA RESEARCH INSTITUTE, INC., Los Altos, CA (US)

(72) Inventors: Naveen Suresh Kuppuswamy, Arlington, MA (US); Alexander Alspach, Somerville, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 380 days.

(21) Appl. No.: 16/591,014

(22) Filed: Oct. 2, 2019

(65) Prior Publication Data

US 2021/0101292 A1 Apr. 8, 2021

(51) Int. Cl.
  *B25J 13/08* (2006.01)
  *G01L 5/22* (2006.01)
  *B25J 15/12* (2006.01)

(52) U.S. Cl.
  CPC ........... *B25J 13/084* (2013.01); *B25J 13/082* (2013.01); *B25J 15/12* (2013.01); *G01L 5/228* (2013.01)

(58) Field of Classification Search
  CPC ........ B25J 13/084; B25J 13/082; B25J 15/12; B25J 9/1694; B25J 9/1612; G01L 5/228;
  (Continued)

(56) References Cited

U.S. PATENT DOCUMENTS 5,740,328 A * 4/1998 Ravani ................. B25J 9/1692
  901/33
6,186,373 B1 * 2/2001 Johanson ............... B65G 47/19
  222/413
(Continued)

FOREIGN PATENT DOCUMENTS

CN  104015197 B  6/2016
CN  106956283 A  7/2017
(Continued)

OTHER PUBLICATIONS

Zapciu, Aurelian et al. "Additive manufacturing integration of thermoplastic conductive materials in intelligent robotic end effector systems." ResearchGate, Dec. 2016, https://www.researchgate.net/figure/3D-printed-adaptive-finger-with-integrated-bending-sensor-1-adaptive-finger-2_fig8_311534441.
(Continued)

*Primary Examiner* — B M M Hannan
(74) *Attorney, Agent, or Firm* — Dinsmore & Shohl LLP

(57) ABSTRACT

Systems and methods for determining a pose of an object held by a flexible end effector of a robot are disclosed. A method of determining a pose of the object includes receiving tactile data from tactile sensors, receiving curvature data from curvature sensors, determining a plurality of segments of the flexible end effector from the curvature data, assigning a frame to each segment, determining a location of each point of contact between the object and the flexible end effector from the tactile data, calculating a set of relative transformations and determining a location of each point relative to one of the frames, generating continuous data from the determined location of each point, and providing the continuous data to a pose determination algorithm that uses the continuous data to determine the pose of the object.

20 Claims, 7 Drawing Sheets

(58) Field of Classification Search
CPC .......... G05B 2219/39527; G05B 2219/39531; G05B 2219/39533; G05B 2219/40566; G05B 2219/40625
USPC ..................................................... 700/258
See application file for complete search history.

(56) References Cited

U.S. PATENT DOCUMENTS

| | | | |
|---|---|---|---|
| 6,243,621 B1* | 6/2001 | Tao ................ | B25J 9/1694 700/86 |
| 9,757,862 B2* | 9/2017 | Alt ................. | G01L 1/25 |
| 9,857,245 B2 | 1/2018 | Onal et al. | |
| 2008/0181758 A1* | 7/2008 | Woodruff ........ | H01L 21/67745 414/744.5 |
| 2009/0302626 A1* | 12/2009 | Dollar ............. | B25J 9/104 294/106 |
| 2012/0123589 A1* | 5/2012 | Kim ................ | B25J 9/1612 700/254 |
| 2013/0211766 A1* | 8/2013 | Rosenberg ...... | G01B 21/16 702/97 |
| 2013/0325181 A1* | 12/2013 | Moore ............. | B25J 13/08 700/259 |
| 2014/0180477 A1* | 6/2014 | Chung ............. | B25J 13/082 700/258 |
| 2015/0367514 A1* | 12/2015 | Shi ................. | B25J 9/1669 700/250 |
| 2016/0265985 A1* | 9/2016 | Onal ............... | G01L 1/122 |
| 2017/0239821 A1 | 8/2017 | Lessing et al. | |
| 2018/0264660 A1* | 9/2018 | Bergeron ......... | G01L 5/228 |
| 2018/0361596 A1 | 12/2018 | Beri | |
| 2019/0291277 A1* | 9/2019 | Oleynik .......... | B25J 9/1669 |
| 2019/0321977 A1* | 10/2019 | Tan ................. | B25J 9/162 |
| 2020/0246980 A1* | 8/2020 | Kuppuswamy .. | G01L 5/0061 |
| 2021/0031368 A1* | 2/2021 | Drumwright .... | B25J 9/1666 |
| 2021/0154854 A1* | 5/2021 | Park ................ | B25J 9/1694 |
| 2021/0213627 A1* | 7/2021 | Nabeto ............ | B25J 13/082 |
| 2021/0354316 A1* | 11/2021 | Nabeto ............ | B25J 13/082 |

FOREIGN PATENT DOCUMENTS

| | | | | |
|---|---|---|---|---|
| CN | 207616561 U | 7/2018 | | |
| CN | 108908379 A | 11/2018 | | |
| EP | 2502714 B1 | 5/2013 | | |
| EP | 2735408 B1 | 4/2016 | | |
| WO | 2017120314 A1 | 7/2017 | | |
| WO | 2018232326 A1 | 12/2018 | | |
| WO | WO-2018232326 A1 * | 12/2018 | ............... | G01L 1/20 |
| WO | WO-2021101514 A1 * | 5/2021 | ............ | B25J 9/1697 |

OTHER PUBLICATIONS

Elgeneidy, Khaled et al. "Bending angle prediction and control of soft pneumatic actuators with embedded flex sensors—A data-driven approach." Elsevier Ltd., 2017, https://www.sciencedirect.com/science/article/pii/S0957415817301496#fig0004.

PCT International Search Report and Written Opinion of the International Searching Authority for PCT/US2020/053377 dated Jan. 19, 2021, 19 pages.

Alspach, Alex et al. "Soft-bubble: A highly compliant dense geometry tactile sensor for robot manipulation." 2019 2nd IEEE International Conference on Soft Robotics (RoboSoft). IEEE, Apr. 14-18, 2019, DOI: 10.1109/ROBOSOFT.2019.8722713.

Alvarez, David et al. "Tactile-Based In-hand Object Pose Estimation." ROBOT 2017: Third Iberian Robotics Conference. Nov. 2017, DOI: 10.1007/978-3-319-70836-2_59.

Nassouh, John et al. "Design of new Sensory Soft Hand: Combining air-pump actuation with superimposed curvature and pressure sensors." 2018 IEEE International Conference on Soft Robotics (RoboSoft). IEEE, Apr. 24-28, 2018, pp. 164-169, DOI: 10.1109/ROBOSOFT.2018.8404914.

Odhner, L. U. et al. "A compliant, underactuated hand for robust manipulation." The International Journal of Robotics Research 2014, vol. 33(5), pp. 736-752, DOI: 10.1177/0278364913514466.

Zug, Sebastian et al. "Optimized configuration of a tactile sensor system for flexible grippers." 22nd IEEE International Conference on Emerging Technologies and Factory Automation, Limassol, Cyprus, IEEE, Sep. 12, 2017 (Sep. 12, 2017), pp. 1-4, DOI: 10.1109/ETFA.2017.8247763.

* cited by examiner

SYSTEMS AND METHODS FOR DETERMINING POSE OF OBJECTS HELD BY FLEXIBLE END EFFECTORS

BACKGROUND

Field

The present specification generally relates to pose estimation systems and, more particularly, to systems that improve a computer's ability to estimate the pose of objects held by flexible end effectors on robots.

Technical Background

Flexible robotic end effectors are particularly useful in grasping oddly shaped objects, objects that are difficult for non-flexible end effectors to grasp, objects that have unknown shape characteristics, and the like.

While the flexible robotic end effectors are particularly useful in pick-and-drop type scenarios (e.g., bin picking scenarios), it may be difficult to achieve precise placement of a manipulated object without information relating to the precise pose of the manipulated object when held by the flexible robotic end effector.

SUMMARY

In one embodiment, a method of determining a pose of an object held by a flexible end effector of a robot having one or more tactile sensors and one or more curvature sensors positioned at the flexible end effector includes receiving, by a processing device, tactile data from the one or more tactile sensors, receiving, by the processing device, curvature data from the one or more curvature sensors, determining, by the processing device, a plurality of segments of the flexible end effector from the curvature data, assigning, by the processing device, a frame to each one of the plurality of segments, determining, by the processing device, a location of each point of contact between the object and the flexible end effector, calculating, by the processing device, a set of relative transformations and determining a location of each point relative to one of the frames from the tactile data, generating, by the processing device, continuous data from the determined location of each point, and providing, by the processing device, the continuous data to a pose determination algorithm that uses the continuous data to determine the pose of the object.

In another embodiment, a system for determining a pose of an object held by a flexible end effector of a robot includes the flexible end effector having one or more flexible fingers, each one of the one or more flexible fingers defined by a flexible internal side member. The system further includes one or more curvature sensors positioned to sense a curvature of each one of the one or more flexible fingers and generate curvature data corresponding to the curvature and one or more tactile sensors positioned adjacent to each one of the one or more flexible fingers, the one or more tactile sensors configured to sense a location of one or more deformations of the flexible internal side member caused by a contact between the flexible end effector and the object held by the flexible end effector and generate tactile data corresponding to the location of the one or more deformations. The system further includes a computing device communicatively coupled to the one or more curvature sensors and the one or more tactile sensors, the computing device programmed to determine the pose of the object held by the flexible end effector by generating continuous data from the curvature data and the tactile data and feeding the continuous data to a pose estimation algorithm.

In yet another embodiment, a system for determining a pose of an object held by a robot includes a robot arm having a flexible end effector with a plurality of flexible fingers, each one of the plurality of flexible fingers defined by a flexible internal side member. The system further includes one or more curvature sensors positioned to sense a curvature of each one of the plurality of flexible fingers and generate curvature data corresponding to the curvature and one or more tactile sensors positioned adjacent to each one of the plurality of flexible fingers, the one or more tactile sensors configured to sense a location of one or more deformations of the flexible internal side member caused by a contact between the flexible end effector and the object held by the flexible end effector and generate tactile data corresponding to the location of the one or more deformations. The system further includes a computing device communicatively coupled to the one or more curvature sensors and the one or more tactile sensors, the computing device programmed to determine the pose of the object held by the flexible end effector by generating continuous data from the curvature data and the tactile data and feeding the continuous data to a pose estimation algorithm.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Figure 1:
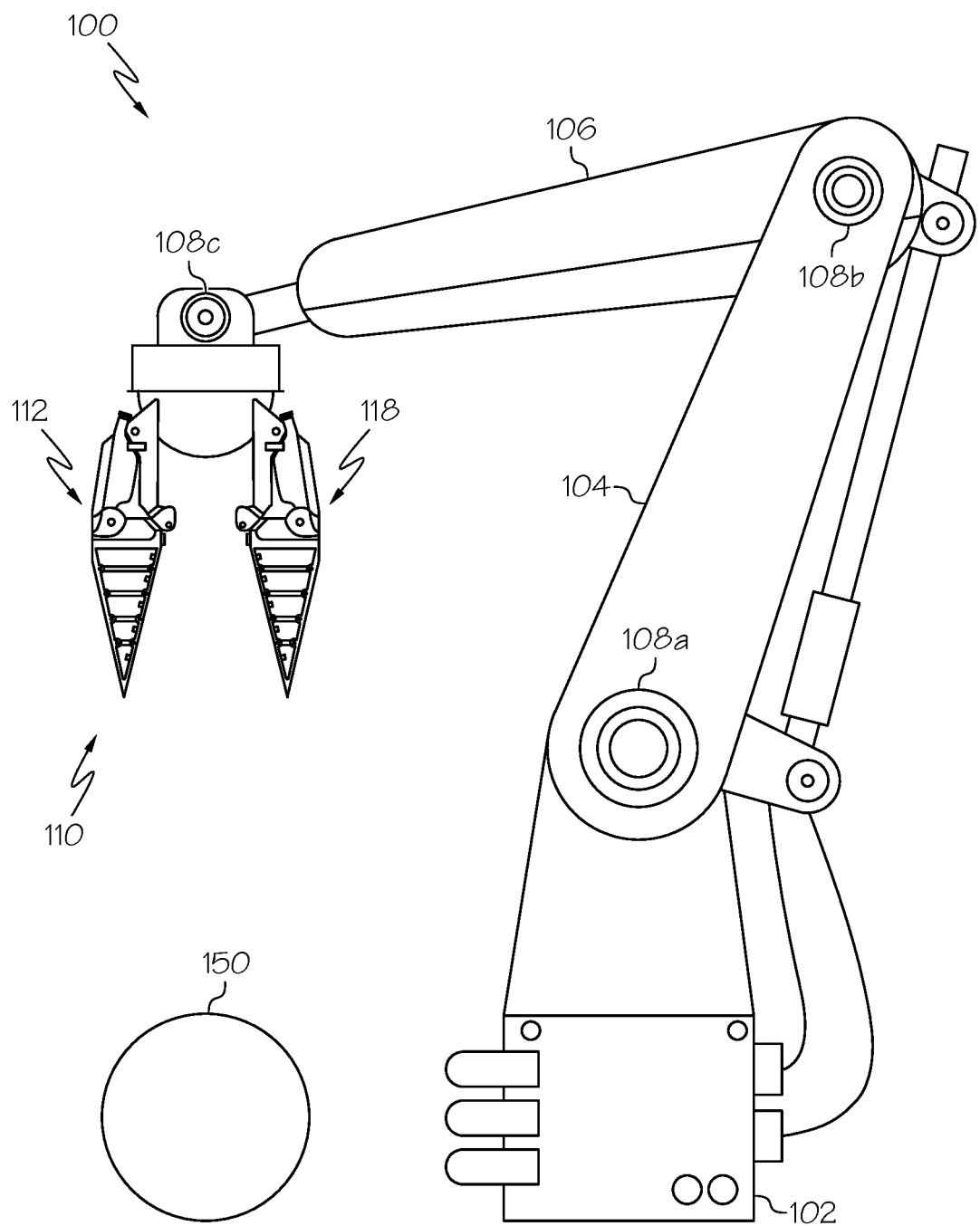
FIG. 1 schematically depicts an illustrative robot arm having a flexible end effector according to one or more embodiments shown and described herein.

The present disclosure relates generally to systems and methods that estimate a pose of an object grasped by a flexible end effector of a robotic device. The systems and methods incorporate one or more tactile sensors and one or more curvature sensors located at or near the flexible end effector of the robotic device such that the one or more tactile sensors can detect information at one or more points of contact between the flexible end effector and the grasped object and the one or more curvature sensors can sense a curvature of the flexible end effector when deformed due to the pressure caused by the contact between the flexible end effector and the grasped object. Data corresponding to the one or more points and the curvature of the flexible end effector can be used in an algorithm to accurately determine the pose of the grasped object. Accurate determination of the pose of the grasped object allows the computer systems controlling the robotic device to determine robot movement that will ensure precise placement of the object when it is released by the flexible end effector. As such, an improvement of the computer systems (as well as the system as a whole) is realized.

Flexible structures are used in robotics because of the compliance they offer, which presents advantages in coping with uncertainty or with unexpected contacts with the environment. However, the mechanics of flexible materials poses issues in a model based robotics framework, rendering existing optimization based methods to be intractable. One such popular example of a flexible structure is that of the so-called finray fingers that have been deployed in a plurality of examples of manipulation in unstructured and uncertain environments. These structures, such as those produced by Festo (Esslingen am Neckar, Germany), have seen usage as flexible fingers for parallel jaw grippers. The structures conform to the surface of the manipuland (the object being manipulated) and thus present a highly reliable grip on a wide variety of domestic objects such as, for example, drinking cups, mugs, small cuboids, and the like due to the large contact patch that they can achieve on these shapes while achieving some form of force and/or form closure through its natural structural properties. While tremendously useful in pick-and-drop type scenarios like often employed in bin picking, such structures present some difficulties in situations where precise placement of a manipuland is desired. This compliance results in uncertainty regarding the pose (primarily orientation) of the manipuland with respect to the gripper after a stable grasp has been achieved. While tactile sensor technology based on capacitive patches, resistive patches, and/or the like can be used to discriminate the presence or absence of contact, through sensing of pressure, the exact location of the contact patches are difficult to compute. Key to this problem is the continuum nature of the contacting surface, such as, for example, determining the location of the contact along a continuously deforming surface.

The present disclosure relates to systems and methods that address this issue by using multiple discrete curvature (flexure) measurements along the flexible surface in order to develop a form of curvature kinematics. This addresses the issue of computing the forward kinematics of the contact point and/or patch and thus computing a form of a "point cloud" in space of the contact path. This approach renders the usage of any flexible surface with dense tactile sensors embedded therein into a dense-geometry sensor. The key assumptions underlying the approach described herein are that the flexion of the material is planar and can be approximated by piecewise constant curvature.

It should be appreciated that the types of sensors that are used herein can also be used to determine a location of the sensors in free space relative to other components of the flexible end effector. That is, the information received from the one or more tactile sensors and/or the one or more curvature sensors can be localized to a particular sensor, regardless of whether that sensor is contacting a target object for the purposes of estimating pose. Such localized information may be useful for various purposes, such as, for example, the temperature at a particular location.

Referring now to the drawings, FIG. 1 depicts an illustrative robot arm, generally designated 100, having a flexible end effector 110 for manipulating a target object 150 according to various embodiments. The illustrative robot arm 100 depicted in FIG. 1 may provide particular use in pick-and-drop application, such as bin picking application. However, it should be appreciated that the robot arm 100 is not limited to this use and may be used for other purposes without departing from the scope of the present disclosure. In some embodiments, the robot arm 100 may be used in the healthcare industry, the manufacturing industry, the vehicle repair industry, and/or the like.

The robot arm 100 may generally include a base 102 coupled to one or more arm segments (e.g., a first arm segment 104 and/or a second arm segment 106) via one or more joints 108a, 108b, 108c, thereby providing the robot arm 100 with a wide range of motion. As robot arms for pick-and-drop applications are generally understood, the robot arm 100 depicted in FIG. 1 is not described in further detail herein.

In some embodiments, the flexible end effector 110 may include one or more flexible fingers, such as a first finger 112 and a second finger 118. While FIG. 1 depicts two fingers, the present disclosure is not limited to such. That is, the flexible end effector may have a single finger, two fingers, three fingers, or more than three fingers without departing from the scope of the present disclosure. The one or more fingers may be movable with respect to one another to open and close the flexible end effector 110 for picking up the target object 150. For example, referring to FIGS. 2A and 2B, the one or more fingers may be movable from an open position (FIG. 2A) whereby the target object 150 is not held by the one or more fingers to a closed position (FIG. 2B) whereby the target object is held by the one or more fingers.

Figure 2:
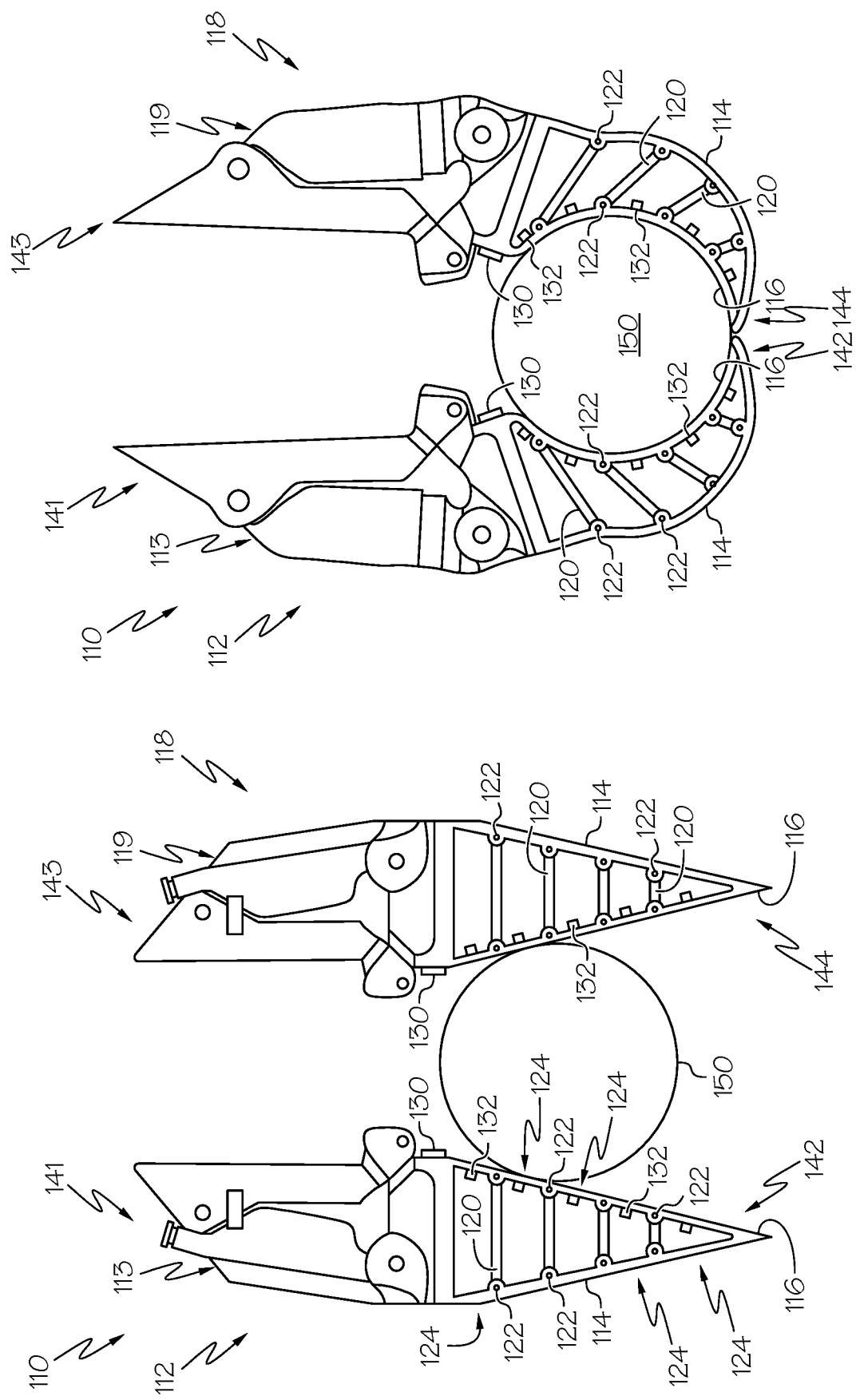
FIG. 2A schematically depicts a detailed view of a flexible end effector when not grasping a target object according to one or more embodiments shown and described herein.
FIG. 2B schematically depicts a detailed view of a flexible end effector that conforms to the shape of a target object when grasping the target object according to one or more embodiments shown and described herein.

Still referring to FIGS. 2A and 2B, additional details regarding the one or more fingers of the flexible end effector 110 are depicted. For example, the first finger 112 may include proximal end 141 and a distal end 142. A grip mechanism 113 causes the distal end 142 to move inwardly toward the second finger 118 when the flexible end effector 110 is placed in the closed position as depicted in FIG. 2B and outwardly away from the second finger 118 when the flexible end effector 110 is placed in the open position as depicted in FIG. 2A. In addition, the second finger 118 may include proximal end 143 and a distal end 144. A grip mechanism 119 causes the distal end 144 to move inwardly toward the first finger 112 when the flexible end effector 110 is placed in the closed position as depicted in FIG. 2B and outwardly away from the first finger 112 when the flexible end effector 110 is placed in the open position as depicted in FIG. 2A.

Referring to FIG. 2A, each of the first finger 112 and the second finger 118 may have an external side member 114 and an internal side member 116. The external side members 114 of the first finger 112 and the second finger 118 may generally be outwardly facing (e.g., the external side member 114 of the first finger 112 faces away from the second finger 118 and the external side member 114 of the second finger 118 faces away from the first finger 112). The internal side members 116 of the first finger 112 and the second finger 118 may generally be inwardly facing (e.g., the internal side member 116 of the first finger 112 faces towards the second finger 118 and the internal side member 116 of the second finger 118 faces towards the first finger 112). All external side members 114 and internal side members 116 may generally be made of a flexible material that is deformable around the target object 150 when the flexible end effector 110 is placed in the closed position around the target object 150 as depicted in FIG. 2B. Flexible materials used in finray-type devices (including finray-type end effectors) should generally be understood and are not described in further detail herein.

Still referring to FIG. 2A, in some embodiments, the external side members 114 and the internal side members 116 may be arranged in a generally triangular configuration such that the external side members 114 and the internal side members 116 are coupled to one another at distal ends thereof (e.g., at the distal end 142 of the first finger 112 and at the distal end 144 of the second finger 118) and extend away from one another when traversed proximally (e.g., towards the proximal end 141 of the first finger 112 and towards the proximal end 143 of the second finger 118). In addition, one or more transverse struts 120 may extend between the respective external side members 114 and the internal side members 116 and may be hingedly coupled to the respective external side members 114 and the internal side members 116 via pins 122 or the like. While FIGS. 2A and 2B depict four (4) transverse struts 120 on each of the first finger 112 and the second finger 118, this is merely illustrative. That is, any number of transverse struts 120 may exist between the respective external side members 114 and internal side members 116 of the first finger 112 and the second finger 118 without departing from the scope of the present disclosure. The transverse struts 120 may generally be spaced apart from one another, spaced apart from the intersection of the external side members 114 with the internal side members 116, and spaced apart from the grip mechanisms 113, 119 such that the internal side members 116 are segmented into a plurality of segments 124. As will be described in greater detail herein, each of the plurality of segments may be sensed for pressure and/or curvature.

As is generally understood, the flexible nature of the internal side members 116 and the external side members 114, along with the hinged attachment of the transverse struts 120, allows for the internal side members 116 to curve around the target object 150 when the flexible end effector 110 grips the target object 150, as depicted in FIG. 2B. As a result of this grip, one or more points on the internal side members 116 contact the target object 150 and each of the internal side members 116 has a particular curvature. While FIG. 2B depicts each internal side member 116 as having a consistent curvature along an entire length thereof due to the circular shape of the target object 150, the present disclosure is not limited to such. That is, in embodiments where the target object 150 is not circular shaped (e.g., has an irregular shape), the point(s) of contact between the internal side members 116 and the target object may cause one or more of the plurality of segments 124 to have a curvature that differs from other ones of the plurality of segments 124. In addition, while FIG. 2B depicts the internal side member 116 contacting the target object 150 along substantially the entire length thereof, the present disclosure is not limited to such. That is, in embodiments where the target object 150 is not circular shape (e.g., has an irregular shape), the point(s) of contact may be dispersed at particular points along the length of the internal side members. Regardless of the shape of the target object 150, when the first finger 112 and the second finger 118 are brought toward each other to the closed position around the target object 150, the flexible nature of the first finger 112 and the second finger 118 generally allows the first finger 112 and the second finger 118 to flex around the target object so as to maintain a secure grasp of the target object and more successfully hold the target object in place relative to robotic end effectors that are not formed of a flexible material.

Referring again to FIGS. 2A and 2B, the flexible end effector 110 may include one or more curvature sensors 130 and one or more tactile sensors 132. The one or more curvature sensors 130 are generally positioned so as to sense the curvature of each of the internal side member 116 of the first finger 112 and the internal side member 116 of the second finger 118, including the curvature of each segment 124 thereof. The one or more tactile sensors 132 are generally positioned so as to sense a location of one or more deformations in the internal side member 116 caused by contact between the target object 150 and the internal side member 116, which in turn allows for a determination of points of contact between the internal side members 116 and the target object 150 when the target object 150 is grasped as depicted in FIG. 2B.

Figure 3:
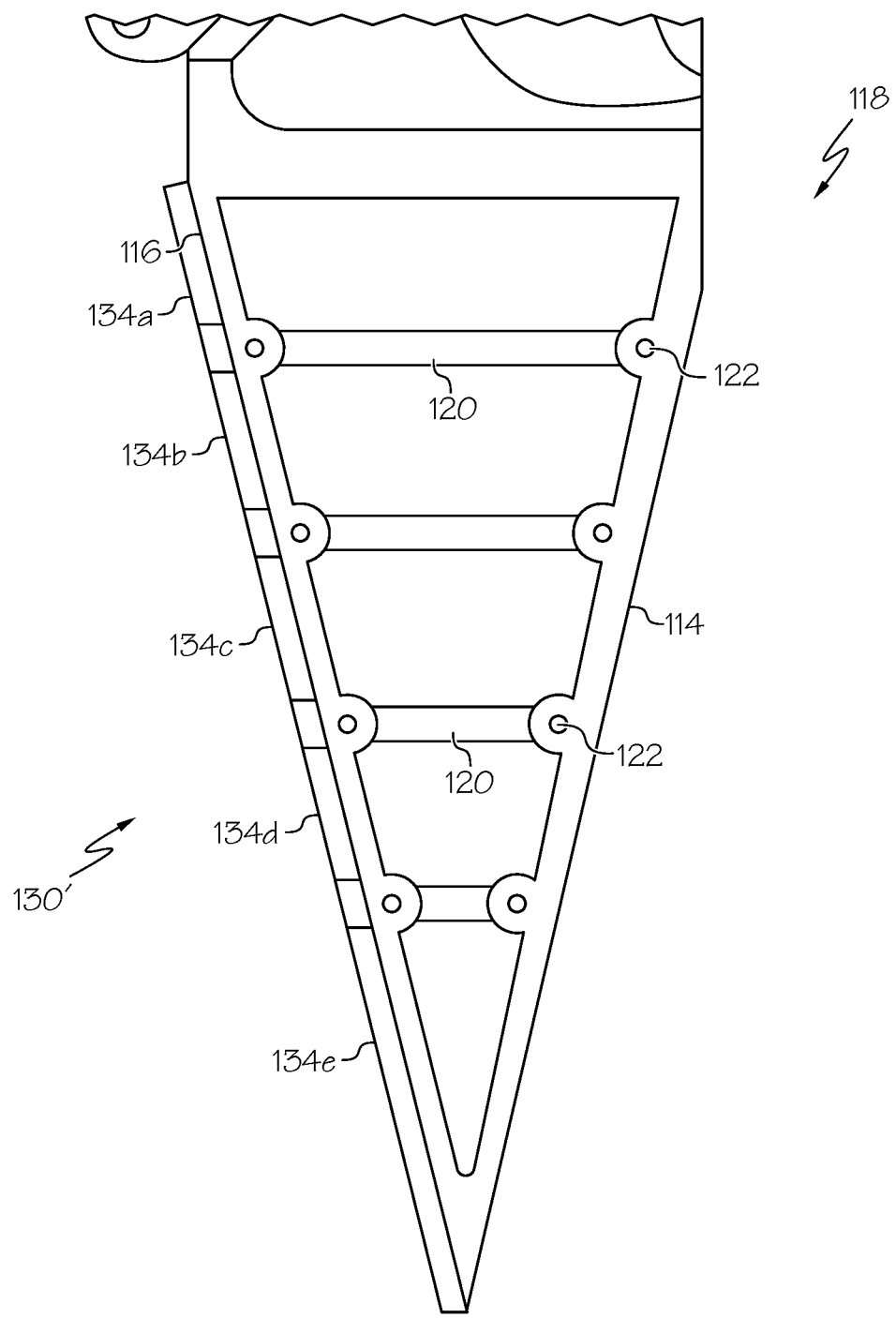
FIG. 3 schematically depicts an illustrative finger of a flexible end effector having flexure sensors thereon according to one or more embodiments shown and described herein.

As depicted in FIGS. 2A and 2B, the curvature sensors 130 are located distally from the target object 150 (e.g., towards the distal ends 142, 144 of the first finger 112 and the second finger 118 respectively). However, the present disclosure is not limited to such. That is, the curvature sensor 130 may be located at any location where curvature of each segment 124 can be detected. For example, as depicted in FIG. 3, an alternative curvature sensor 130' may be a strip of flexible material disposed on a surface of each finger (second finger depicted in FIG. 3). For example, the strip of flexible material may extend along a total length of the internal side member 116. While the alternative curvature sensor 130' is depicted in FIG. 3 as being on an outside surface of the internal side members 116, this is merely illustrative. That is, the alternative curvature sensor 130' may be on an inside surface of the internal side members 116, on an outside surface of the external side members 114, on an internal surface of the external side members 114, or any other location with respect to the flexible end effector 110, so long as the alternative curvature sensor 130' is able to adequately sense the curvature of the internal side members 116, as described herein.

In some embodiments, the alternative curvature sensor 130' may have a plurality of curvature sensing segments (e.g., a first curvature sensing segment 134a, a second curvature sensing segment 134b, a third curvature sensing segment 134c, a fourth curvature sensing segment 134d, and a fifth curvature sensing segment 134e). In some embodiments, each of the curvature sensing segments may correspond to each of the plurality of segments 124 of the internal side member 116. In some embodiments, one or more of the curvature sensing segments may span a plurality of segments. In some embodiments, one or more of the curvature sensing segments may span a length that is less than a length of a segment. In some embodiments, one curvature sensing segment may overlap another curvature sensing segment (e.g., overlapping curvature sensing segments).

Referring again to FIGS. 2A-2B, the one or more tactile sensors 132 may generally be located at positions along a length of the internal side members 116 of the first finger 112 and the second finger 118 such that the pressure resulting from contact between the target object 150 and the internal side members 116 is detected for the purposes of determining a location of contact. For example, as depicted in FIGS. 2A-2B, at least one tactile sensor 132 may be located in each segment 124 so as to sense contact in that segment 124. However, it should be understood that the one or more tactile sensors 132 may be located elsewhere in some embodiments. The precise location of each tactile sensor 132 relative to other components of the flexible end effector 110 (e.g., other tactile sensors 132, the plurality of segments, the distal ends 142, 144, the proximal ends 141, 143, and/or the like) may be stored in a storage device or the like for later access. That is, the location of each tactile sensor 132 is known such that the location of each tactile sensor 132 in free space is known as the robot arm 100 and/or components thereof (e.g., the flexible end effector 110) move. Such information may provide localized data, regardless of whether the particular tactile sensor 132 senses contact with the target object 150. For example, a temperature of the target object 150 at a point of contact with a particular tactile sensor 132 may be obtained, a temperature in a particular area surrounding the target object 150 may be obtained, and/or the like.

Each of the curvature sensors 130 may generally be any device that that can sense a curvature of an object, particularly the curvature of the internal side members 116 of the first finger 112 and the second finger 118 and outputs data corresponding thereto (e.g., curvature data). In some embodiments, the curvature sensors 130 may be Hall-effect sensors that are particularly configured to sense curvature. In some embodiments, the curvature sensors 130 may be tactile sensors that are flexible, such as, for example, sensors available from Tekscan, Inc. (South Boston, Mass.). In other embodiments, the curvature sensors 130 may by physical flexion sensors such as the Bend Sensor® available from Flexpoint Sensor Systems Inc. (Draper, Utah). In still yet other embodiments, the curvature sensors 130 may be image based sensors, such as imaging devices that obtain images of the internal side members 116 such that a curvature can be determined therefrom (e.g., via one or more image processing algorithms).

Each of the tactile sensors 132 may be a high resolution sensor or a low resolution sensor. A high resolution sensor generally refers to any type of tactile sensor that senses with a relatively higher level of accuracy or spatial density, and may include one or more cameras, a high resolution pressure sensing grid, and/or the like. A low resolution sensor generally refers to any type of tactile sensor that senses with a relatively lower level of accuracy or spatial density and may include, for example, a single point pressure sensor. In some embodiments, each of the tactile sensors 132 may be any force collector type device that uses a force collector (e.g., a diaphragm, a piston, a bourdon tube, bellows, and/or the like) to measure an amount of strain or deflection due to applied force over a measured or predetermined area and outputs data corresponding thereto (e.g., tactile data). As such, when a deformation of the internal side members 116 occurs due to contact between the flexible end effector 110 and the target object 150, the tactile sensors 132 are arranged and configured to sense the deformation for the purposes of pinpointing the location of the deformation, which in turn can be used to determine the location of the target object 150 relative to one or more portions of the flexible end effector 110 and/or pose of the target object 150 when grasped, as described in greater detail herein. In some embodiments, other data may be sensed by the tactile sensors 132, such as, for example, temperature. Illustrative examples of a tactile sensor include, but are not limited to, a piezoresistive strain gauge sensor, a capacitive sensor, an electromagnetic sensor, a piezoelectric sensor, a strain gauge sensor, an optical sensor, and a potentiometric sensor. In some embodiments, the one or more tactile sensors 132 may be one or more pressure map sensors that generate data in the form of a pressure map. In other embodiments, the one or more tactile sensors 132 that sense pressure and generate tactile data in the form of pressure data. Other types of sensors should be generally understood, and are included within the scope of the present disclosure.

In some embodiments, the curvature sensors 130 and the tactile sensors 132 may be integrated into a single device. That is, a single device contains both curvature sensing and pressure sensing capabilities. In addition, the single device may output two distinct data streams: one pertaining to a sensed curvature at one or more points (e.g., curvature data), and another pertaining to a sensed pressure at one or more points (e.g., tactile data).

Figure 4A:
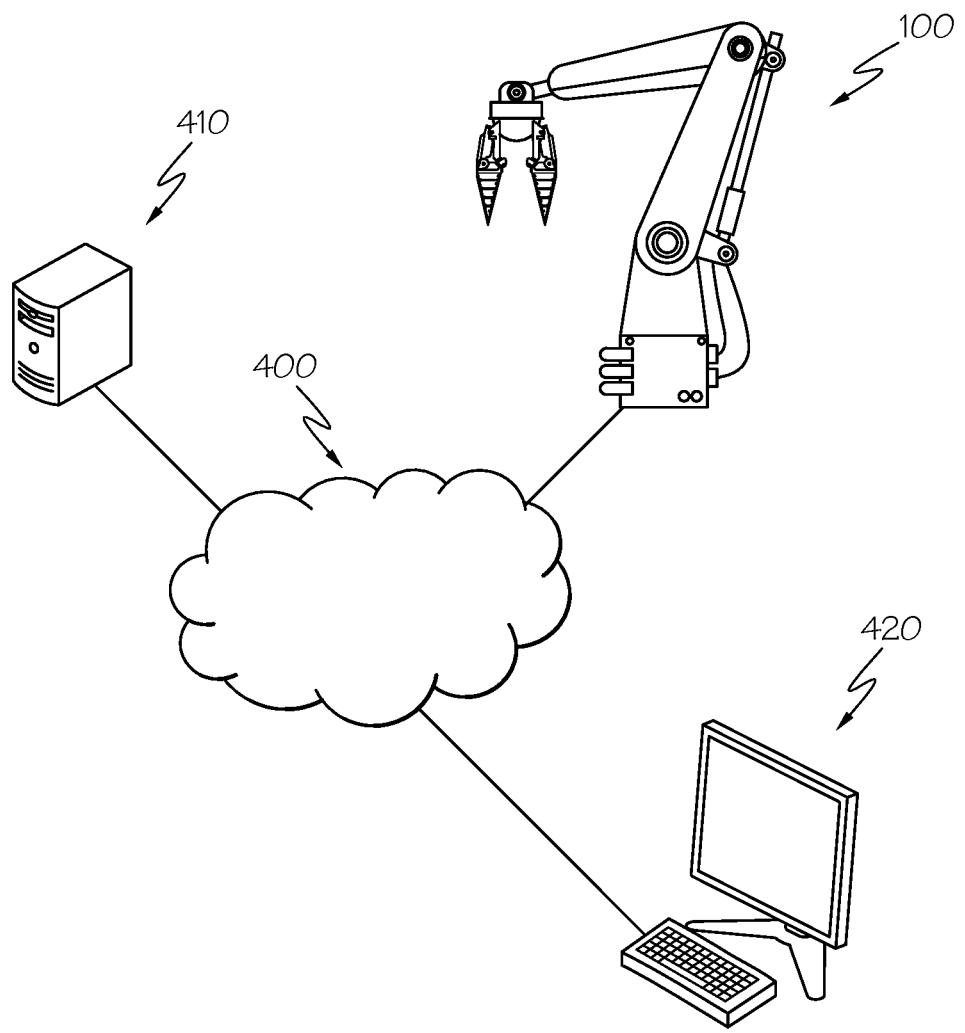
FIG. 4A schematically depicts an illustrative network of devices communicatively coupled to a robot arm having a flexible end effector according to one or more embodiments shown and described herein.

Referring now to FIG. 4A, the robot arm 100 may be communicatively coupled to one or more computing devices that carry out processes for determining an orientation of the target object 150 (FIG. 1) when grasped in some embodiments. However, it should be understood that the robot arm 100 may have one or more internal components (e.g., a processor, a memory, etc.) for carrying out processes for determining an orientation of the target object 150 (FIG. 1) when grasped in other embodiments. In still other embodiments, a combination of internal components within the robot arm 100 and one or more other computing devices may be used for carrying out processes for determining a positioning and/or an orientation of the target object 150 (FIG. 1) when grasped.

As illustrated in FIG. 4A, a robot communications network 400 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The robot communications network 400 may generally be configured to electronically connect one or more devices such as computing devices and/or components thereof. Illustrative devices may include, but are not limited to, the robot arm 100, a server computing device 410, and/or a user computing device 420.

Still referring to FIG. 4A, the user computing device 420 may generally be used as an interface between a user and the other components connected to the robot communications network 400. Thus, the user computing device 420 may be used to perform one or more user-facing functions, such as receiving one or more inputs from a user or providing information to the user. Accordingly, the user computing device 420 may include at least a display and/or input hardware. In the event that the server computing device 410 requires oversight, updating, and/or correction, the user computing device 420 may be configured to provide the desired oversight, updating, and/or correction. The user computing device 420 may also be used to input additional data into a corpus of data stored on the server computing device 410. For example, the user computing device 420 may allow a user to input data regarding known target object dimensions, details regarding pick and drop surfaces, and/or the like.

The server computing device 410 may receive data from one or more sources (e.g., the one or more tactile sensors (tactile data) and/or the one or more curvature sensors (curvature data)), analyze received data (e.g., determine shape and/or dimensional characteristics of a target object, determine a pose of a grasped target object, determine an orientation of a target location, transmit instructions to the robot arm 100 for placing the grasped target object, and/or the like), generate data, store data, index data, search data, and/or provide data to the user computing device 420 and/or the robot arm 100 (or components thereof). More specifically, the server computing device 410 may receive information regarding the target object (including identification information, shape information, and/or dimensional information), receive data from the one or more curvature sensors 130 (FIG. 2A) and the one or more tactile sensors 132 (FIG. 2A), determine a curvature and one or more points of contact between the target object 150 (FIG. 1) and the robot arm 100 (e.g., the flexible end effector 110 thereof), determine a pose of the target object 150 from the curvature and the one or more points of contact, and/or the like, as described in greater detail herein. In some embodiments, the server computing device 310 may employ one or more software modules for carrying out the above-mentioned processes, as described in greater detail herein.

Still referring to FIG. 4A, it should be understood that while the user computing device 420 is depicted as a personal computer and the server computing device 410 is depicted as a server, these are nonlimiting examples. In some embodiments, any type of computing device (e.g., mobile computing device, personal computer, server, cloud-based network of devices, etc.) may be used for any of these components. Additionally, while each of these computing devices is illustrated in FIG. 4A as a single piece of hardware, this is also merely an example. Each of the user computing device 420 and the server computing device 410 may represent a plurality of computers, servers, databases, components, and/or the like.

Figure 4B:
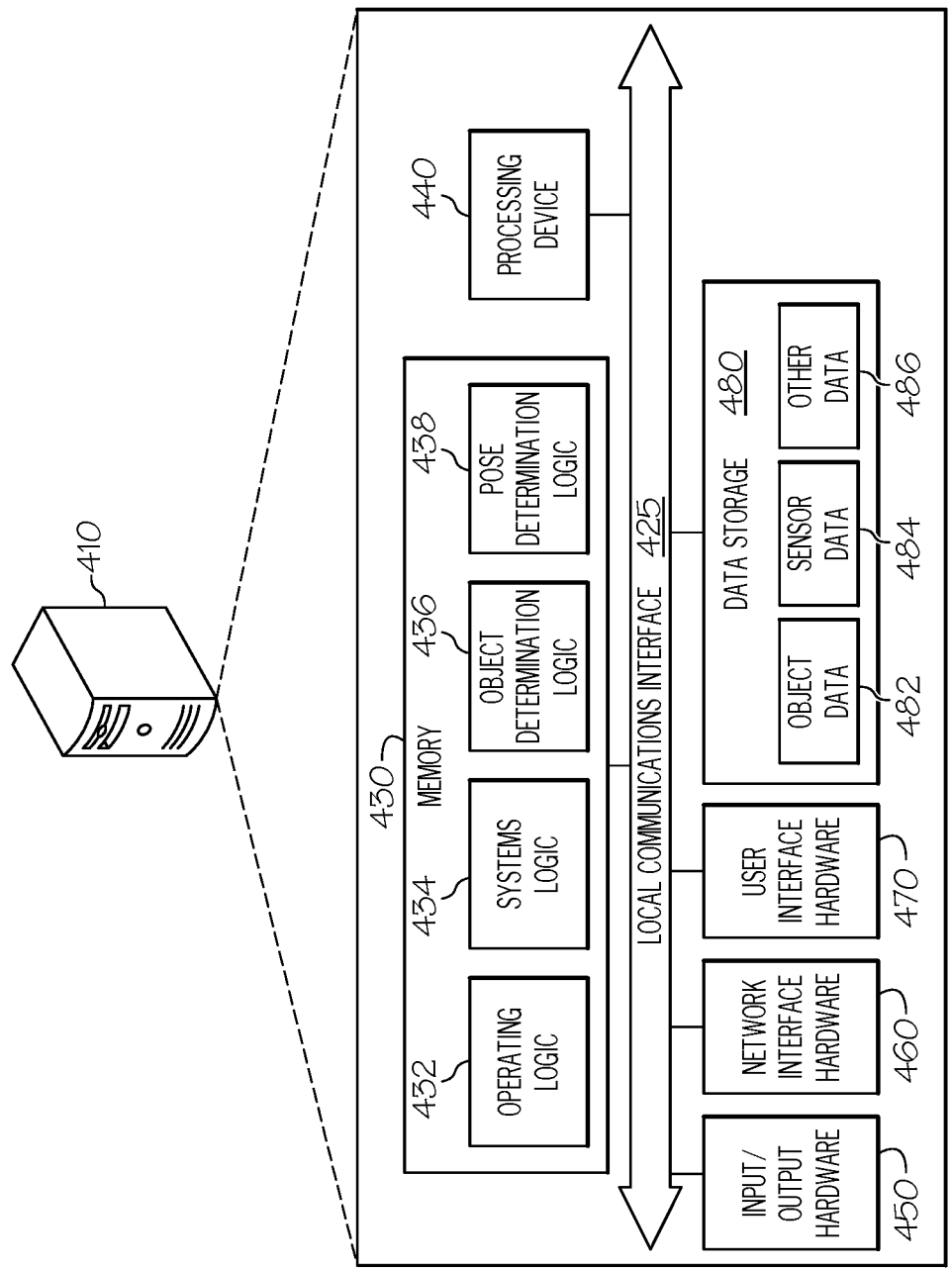
FIG. 4B schematically depicts illustrative internal components of a server computing device in a network of devices communicatively coupled to a robot arm having a flexible end effector according to one or more embodiments shown and described herein.

FIG. 4B depicts illustrative internal components of the server computing device 410 that provide the server computing device 410 with the functionality described herein. While FIG. 4B relates particularly to the server computing device 410, it should be understood that the same or similar components may also be included within the robot arm 100 and/or the user computing device 420 (FIG. 4A) without departing from the scope of the present disclosure.

As illustrated in FIG. 4B, the server computing device 410 may include a non-transitory memory component 430, a processing device 440, input/output (I/O) hardware 450, network interface hardware 460, user interface hardware 470, and a data storage component 480. A local interface 425, such as a bus or the like, may interconnect the various components.

The processing device 440, such as a computer processing unit (CPU), may be the central processing unit of the server computing device 410, performing calculations and logic operations to execute a program. The processing device 440, alone or in conjunction with the other components, is an illustrative processing device, computing device, processor, or combination thereof. The processing device 440 may include any processing component configured to receive and execute instructions (such as from the data storage component 480 and/or the memory component 430).

The memory component 430 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 430 may include one or more programming instructions thereon that, when executed by the processing device 440, cause the processing device 440 to complete various processes, such as the processes described herein with respect to FIG. 5.

Still referring to FIG. 4B, the programming instructions stored on the memory component 430 may be embodied as a plurality of software logic modules, where each logic module provides programming instructions for completing one or more tasks. Illustrative logic modules depicted in FIG. 4B include, but are not limited to, operating logic 432, systems logic 434, object determination logic 436, and/or pose determination logic 438. Each of the logic modules shown in FIG. 4B may be embodied as a computer program, firmware, or hardware, as an example. The operating logic 432 may include an operating system and/or other software for managing components of the server computing device 410. The systems logic 434 may generally include logic for directing operation of components of the robot arm 100 (FIG. 4A), such as, for example, directing movement of the robot arm 100 (and/or components thereof), receiving sensor data from the robot arm 100 (e.g., tactile data and/or curvature data), and/or the like. Still referring to FIG. 4B, the object determination logic 436 may include one or more programming instructions for determining a target object, determining a location of a target object relative to the robot arm 100 (or components thereof), determining a shape of a target object, determining dimensional aspects of a target object, and/or the like. The pose determination logic 438 may include one or more programming instructions for receiving data from one or more sensors (e.g., a curvature sensor, a tactile sensor, and/or the like), determining a location of the target object relative to one or more portions of the robot arm 100 (e.g., one or more sensors thereof), determining a curvature of one or more portions of an end effector, determining one or more points of contact between an end effector and a target object, and/or calculating a pose of a grasped target object.

Still referring to FIG. 4B, the I/O hardware 450 may communicate information between the local interface 425 and one or more components of the robot arm 100 (FIG. 4A). For example, the I/O hardware 450 may act as an interface between the robot arm 100 (FIG. 4A) and other components of the server computing device 410, so as to facilitate commands transmitted by the server computing device 410, data transmitted between the robot arm 100 and the server computing device 410, and/or the like, as described in greater detail herein.

The network interface hardware 460 may include any wired or wireless networking hardware, such as a modem, LAN port, wireless fidelity (Wi-Fi) card, WiMax card, mobile communications hardware, and/or other hardware for communicating with other networks and/or devices. For example, the network interface hardware 460 may be used to facilitate communication between external storage devices, the user computing device 420 (FIG. 4A), and the robot arm 100 via the robot communications network 400. In some embodiments, the I/O hardware 450 and the network interface hardware 460 may be integrated into a single device that handles all communications to and from the server computing device 410.

Still referring to FIG. 4B, the data storage component 480, which may generally be a storage medium, may contain one or more data repositories for storing data that is received and/or generated. The data storage component 480 may be any physical storage medium, including, but not limited to, a hard disk drive (HDD), memory, removable storage, and/or the like. While the data storage component 480 is depicted as a local device, it should be understood that the data storage component 480 may be a remote storage device, such as, for example, a server computing device, cloud based storage device, or the like. Illustrative data that may be contained within the data storage component 480 includes, but is not limited to, object data 482, sensor data 484, and/or other data 486. The object data 482 may generally be data that is used by the server computing device 410 to recognize particular target objects. For example, the server computing device 410 may access the object data 482 to obtain a reference images and/or other data pertaining to a particular target object (e.g., dimensions of a target object, shape of a target object, identification of a target object, and/or the like) in order to estimate a pose of the target object when grasped by the robot arm 100 (FIG. 4A). Still referring to FIG. 4B, the object data 482 may be prepopulated data or may be data that is continuously updated with images such that the server computing device 410 utilizes a machine learning algorithm to recognize particular characteristics of a target object. The sensor data 484 may generally include data that is obtained from the various sensors associated with the robot arm 100 (FIG. 4A), such as, for example, data obtained from the one or more curvature sensors 130 (FIG. 2A) (e.g., curvature data) and/or data obtained from the one or more tactile sensors 132 (FIG. 2A) (e.g., tactile data). Still referring to FIG. 4B, the other data 486 may generally be any other data that is used to determine a curvature of end effectors, determine points of contact, determine a location of the target object relative to one or more components (e.g., one or more sensors), determine localized information from a particular sensor regardless of whether contact occurs, determine a pose of a grasped object, and determine instructions for directing the robot arm 100 (FIG. 4A), as described herein.

It should be understood that the components illustrated in FIG. 4B are merely illustrative and are not intended to limit the scope of this disclosure. More specifically, while the components in FIG. 4B are illustrated as residing within the server computing device 410, this is a nonlimiting example. In some embodiments, one or more of the components may reside external to the server computing device 410.

Figure 5:
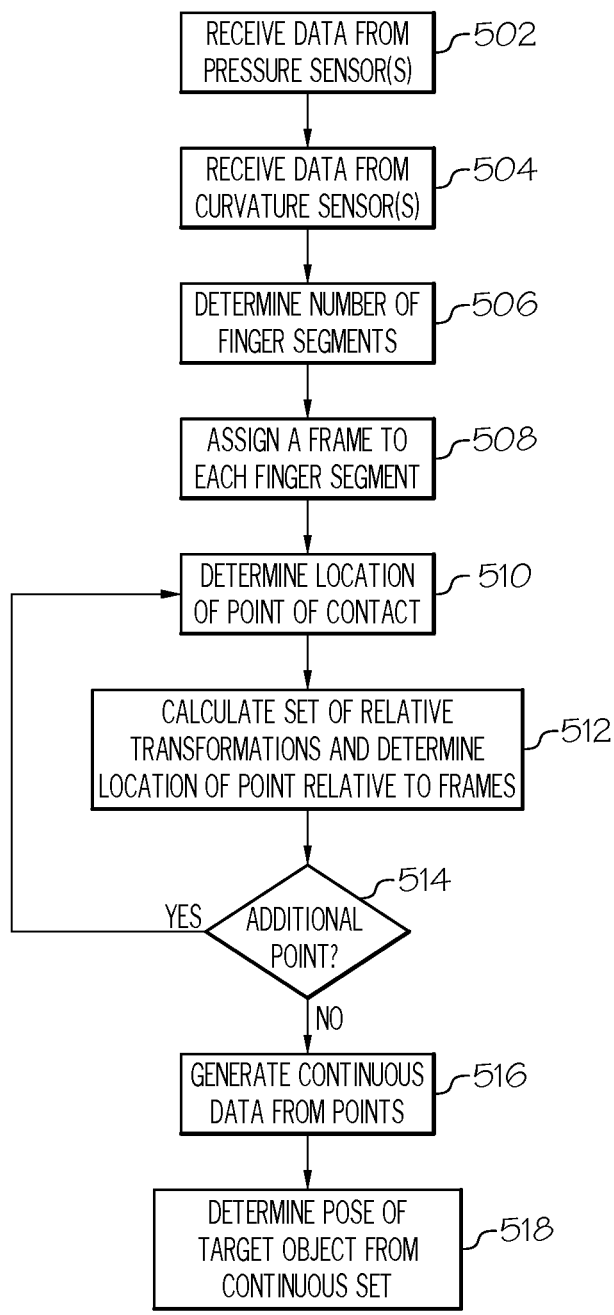
FIG. 5 depicts a flow diagram of an illustrative method of determining a pose of an object held by a flexible end effector according to one or more embodiments shown and described herein.

As mentioned above, the various components described with respect to FIGS. 4A-4B may be used to carry out one or more processes and/or provide functionality for determining a target object, determining one or more shape and/or size characteristics of a target object, determining a curvature of a robot end effector when contacting the target object, determining one or more points of contact between the robot end effector and the target object, determining a pose of a grasped target object, determining one or more movement instructions for moving the robot arm, and directing the robot arm to move. An illustrative example of the various processes are described with respect to FIGS. 5-7 hereinbelow. The various processes described with respect to FIGS. 5-7 may generally be completed by the server computing device 410, the user computing device 420, the robot arm 100 or a component thereof, such as, for example, the one or more curvature sensors 130 and/or the one or more tactile sensors 132 (FIG. 2A). FIG. 5 depicts an illustrative method of determining a pose of a grasped target object, which includes determining the target object, determining dimensional and/or shape characteristics of the target object, determining a curvature of an end effector, and determining one or more points of contact between the end effector and the target object when the target object is grasped (e.g., when the target object is a manipuland). The various steps described with respect to FIG. 5 are merely illustrative, and additional, fewer, or alternative steps are contemplated without departing from the scope of the present disclosure. In addition, while the processes are described as being completed by the server computing device 410, the present disclosure is not limited to such. That is, various processes may be completed by the robot arm 100 (or components thereof), the user computing device 420 (or components thereof), or any combination of the server computing device 410 (or components thereof), the user computing device 420 (or components thereof), and the robot arm 100 (or components thereof).

While also generally referring to FIGS. 1, 2A-2B, and 4B, at block 502, data (e.g., tactile data) may be received from the one or more tactile sensors 132. That is, the one or more tactile sensors 132 may sense a pressure indicative of a contact between the target object 150 and one or more particular points on the flexible end effector 110 (e.g., one or more points along the internal side members 116 of the first finger 112 and/or the second finger 118) and may transmit data corresponding to the location of the one or more particular points to the server computing device 410 (e.g., tactile data). In some embodiments, the one or more tactile sensors 132 may transmit additional data to the server computing device 410, such as, for example, data pertaining to an amount or magnitude of force applied on each of the one or more tactile sensors 132 by the contact between the target object 150 and the flexible end effector 110 (e.g., the internal side member 116 of the first finger 112 and/or the second finger 118), the direction of the force applied on each of the one or more tactile sensors 132 by the contact between the target object 150 and the flexible end effector 110, and/or the like.

At block 504, data (e.g., curvature data) may be received from the one or more curvature sensors 130. That is, the one or more curvature sensors 130 may sense a curvature of each segment 124 of the internal side members 116 of the first finger 112 and/or the second finger 118 and may transmit data corresponding to the curvature of each segment 124 (e.g., curvature data) to the server computing device 410.

At block 506, the number of finger segments are determined from the data received from the one or more curvature sensors 130 and the one or more tactile sensors 132. Such a determination may generally include determining one or more points at which each of the first finger 112 and the second finger 118 are sectioned. In some embodiments, each segment may correspond to the joints (e.g., hinged locations where each of the internal side members 116 are coupled to a transverse strut 120). In such embodiments, determining finger segments according to block 506 may include imaging or otherwise sensing where the internal side members 116 are coupled to a transverse strut 120 or accessing data that provides information regarding the location of the joints. In other embodiments, each segment may correspond to a location where a new curvature of the internal side members 116 is detected (e.g., the segments are divided by an inflection point). Such a determination may be completed by analyzing the data obtained from the one or more curvature sensors 130 and calculating one or more locations where the curvature changes. In yet other embodiments, each segment may be arbitrarily assigned along the length of the internal side members. For example, if a particular internal side member 116 is to be divided into 6 segments as depicted in FIG. 6 (e.g., $S_1$, $S_2$, $S_3$, $S_4$, $S_5$, and $S_6$), the dividing points may be selected such that the length of each segment is a particular length (e.g., such that the segments each have an equal length).

Figure 6:
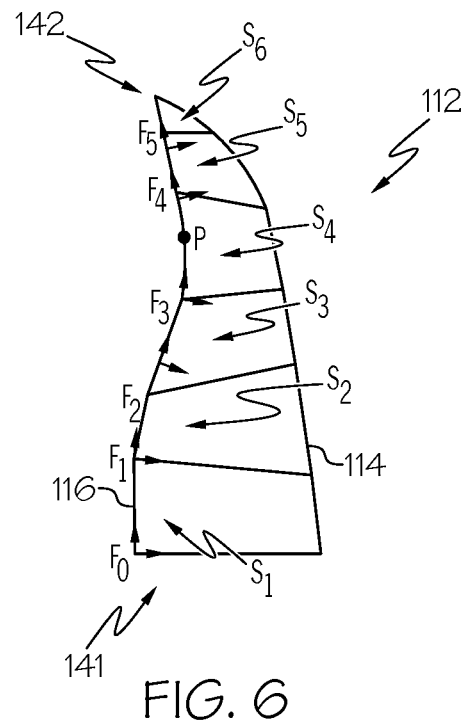
FIG. 6 depicts an illustrative piecewise constant curvature model of a flexible end effector according to one or more embodiments shown and described herein.

Referring to FIGS. 1, 2A-2B, 4B, and 5-6, at block 508, a frame is assigned to each finger segment. That is, a frame that is tangential to the curve of the internal side member 116 at the point of each proximal end of each finger segment is assigned. For example, as depicted in FIG. 6, the frames $F_0$, $F_1$, $F_2$, $F_3$, $F_4$, and $F_5$ are located at the internal side member 116 at the point of each proximal end (e.g., towards the proximal end 141) of each segment $S_1$, $S_2$, $S_3$, $S_4$, $S_5$, and $S_6$, respectively. However, it should be understood that the assigned frames depicted in FIG. 6 are merely illustrative, and the frames may be assigned different locations in other embodiments. The frames $F_0$, $F_1$, $F_2$, $F_3$, $F_4$, and $F_5$ may further be established such that each segment has a corresponding length L and a curvature $\kappa_i$. The curvature $\kappa_i$ is defined as the inverse of the radius $r_i$ of the particular segment. The curvature $\kappa_i$ generally remains constant for each of the frames $F_0$, $F_1$, $F_2$, $F_3$, $F_4$, and $F_5$, but may vary between each of the frames $F_0$, $F_1$, $F_2$, $F_3$, $F_4$, and $F_5$. That is, each of the frames $F_0$, $F_1$, $F_2$, $F_3$, $F_4$, and $F_5$ may define an inflection point where the curvature changes. As such, assigning a frame according to block 508 may include assigning the frame based on a determination of one or more inflection points along a curvature of the internal side member 116.

Still referring to FIGS. 1, 2A-2B, 4B, and 5-6, at block 510, a location of a point of contact may be determined. That is, the data received from the one or more tactile sensors 132 may be used to map a location of a point of contact between the target object 150 and the internal side member 116. As depicted in FIG. 6, a point of contact is established at point P because the data from the one or more tactile sensors 132 indicates contact between the target object 150 and the internal side member 116 at this point (e.g., the contact causes a force to be applied upon at least one of the one or more tactile sensors 132). Accordingly, a determination according to block 510 may include determining a location of a tactile sensor 132 that indicated contact relative to the internal side member 116 and determining the point of contact based on the location of the tactile sensor and characteristics of the sensed pressure (e.g., location, magnitude of force, direction of force, or the like). It should be understood that such a determination according to block 510 may also include determining a location of each tactile sensor 132 in space with respect to the various other portions of the flexible end effector 110, which can further be used to determine a location of the target object 150 relative to the flexible end effector 110 and/or one or more components thereof. Further, additional information received at each tactile sensor 132, regardless of whether contact is sensed with the target object 150, together with the determined location of the tactile sensor 132 in space, may be used to determine location specific information (e.g., a temperature, etc.).

At block 512, a set of relative transformations is calculated and a location of the point P relative to the frames is determined. That is, a set of relative transformations $^{F_{i+1}}X_{F_i}$ and the location of point P relative to its respective base frame F is determined in a world reference frame W. If it is assumed that the flexion of the material used for the internal side member 116 is constrained to be planar and can be approximated by piecewise constant curvature, then the shape of the curved internal side member 116 can be reconstructed through form measurements and the contact location of point P in the world reference frame W can be computed by reducing to a form similar to rigid structure kinematics.

Using FIG. 6 as an example, the curve of the internal side member 116 is split into 6 segments ($S_1$, $S_2$, $S_3$, $S_4$, $S_5$, and $S_6$). For each segment i, a frame Fi is assigned at a proximal end thereof, the coordinate frame Fi being tangential to the curve along its x vector at that point. The segments each have a corresponding length $l_i$ and curvature $k_i$ (defined as the inverse of radius $r_i$). A set of relative transformations $^{F_{i+1}}X_{F_i}$ and the location of the point P relative to its base frame $F_c$, then $$^{W}X_c = \prod_{i=0}^{c-1} {^{F_{i+1}}X_{F_i}} \quad (1)$$

where I is the segment index going from 0 until c, which is the segment where contact occurred, and $^{F_i}X_{F_i}$ is the relative transform between the coordinate frames associated with segment I and I+1. From Equation (1) above, the location of P is obtained as $$W_{p_P} = {^{W}R_{F_c}} {^{F_c}p_P} + {^{W}p_{F_c}} \quad (2)$$

where $W_{p_P}$ are the coordinates of point P in the world reference frame W, $^{W}R_{F_c}$ is the rotation matrix corresponding to the world (W) and contact ($F_c$) frames, $^{F_c}p_P$ is the coordinates of point P in the Fc frame and similarly, $^{W}p_{F_c}$ described the position vector between the world frame and frame Fc.

Figure 7:
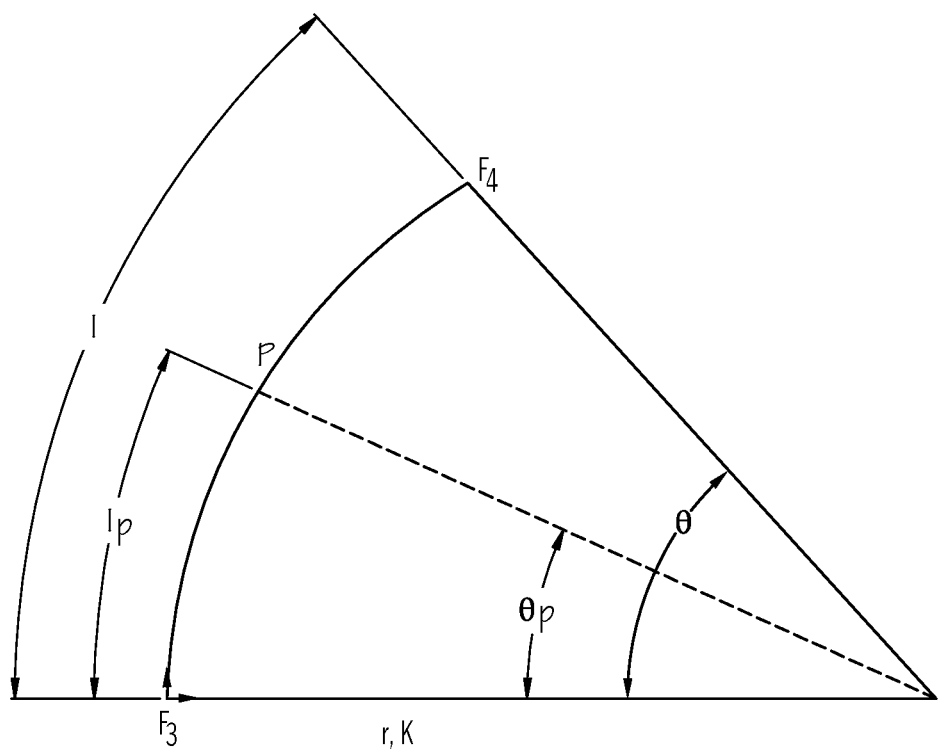
FIG. 7 depicts an illustrative segment arc that is used for determining a curvature of a segment of a flexible end effector according to one or more embodiments shown and described herein.

For each segment i as depicted in FIG. 7, the transformation of the frame relative to transformation $^{F_{i+1}}X_{F_i}$ is obtained as a translation along the curve by an angle about $\hat{z}$ of $\theta$. This can be computed as $$^{F_{i+1}}X_{F_i} = \begin{bmatrix} R_z(\theta_i) & {^{F_{i+1}}p_{F_i}} \\ 0 & 1 \end{bmatrix} \quad (3)$$

where the relative position vector $$^{F_{i+1}}p_{F_i} = \frac{1}{\kappa_i}[1-\cos(\theta_i), \sin(\theta_i), 0]^T,$$

and $\theta_i = l_i \kappa_i$, where $\kappa_i$ and $R_z(\theta_i)$ is a rotation matrix representing a rotation about $\hat{z}$ by an angle of $\theta_i$.

The location $^{F_c}p_P$ is computed similarly if the arc length $l_p$ of the contact location along segment c is known by $$^{F_c}p_P = \kappa_c[1-\cos(\theta_P), \sin(\theta_P), 0]^T \quad (4)$$

where $\theta_P = \kappa_c l_c$ and $\kappa_c$ is the curvature of the segment c with the frame $F_c$ associated with the segment.

Referring again to FIGS. 1, 2A-2B, 4B, and 5-6, it should be understood that the calculations described above with respect to equations (1)-(4) may be completed for each point P where the data received from the one or more tactile sensors 132 is indicative of contact between the target object 150 and the internal side members 116 of the first finger 112 and the second finger 118. As such, at block 514, a determination is made as to whether additional points exists. If so, the process may return to block 510 such that the processes according to block 510 and block 512 are completed for each additional point P. Once all of the points have been calculated, the process may proceed to block 516.

At block 516, continuous data is generated from all of the points, which is used for the purposes of pose estimation. For example, in some embodiments, the points may be stored as a continuous data stream that is recorded in the data storage component 480 for subsequent access. In other embodiments, the continuous data may be continuously fed into an algorithm that is used for determining the pose of the grasped target object 150 (e.g., a pose determination algorithm).

Accordingly, at block 518, the pose of the grasped target object (also referred to as a manipuland pose, a grasp pose, or an in-hand pose) is determined. That is, in a nonlimiting example, the continuous data may be fed into a pose determination algorithm, such as an iterative closest point (ICP) algorithm, which is used to determine the pose of the grasped target object. Other algorithms now known or later developed may also be used to determine the pose of the grasped target object. Consider a set of contact points $[P_0, \ldots, P_n]$, from a manipuland contacting the flexible end effector 110 (e.g., the first finger 112 and/or the second finger 118). Through the methods described herein, the location of the points can be computed in world frame and thus can directly be used in an algorithm such as the ICP style minimization. One possibility is to use methods such as Dense Articulated Real Time Tracking (DART) algorithms (and/or other algorithms now known or later developed) in order to compute the pose through pre-computed signed distance functions (SDFs).

It should now be understood that the systems and methods described herein can determine a pose of an object grasped by a flexible end effector of a robot arm. The systems and methods incorporate one or more tactile sensors and one or more curvature sensors located at or near the flexible end effector to detect one or more points of contact between the flexible end effector and the grasped object and a curvature of the flexible end effector when deformed due to the pressure caused by the contact between the flexible end effector and the grasped object. Data corresponding to the one or more points and the curvature of the flexible end effector can be used to accurately determine the pose of the grasped object while it is being grasped in real-time. Accurate determination of the pose of the grasped object allows the computer systems controlling the robotic device to determine robot movement that will ensure precise placement of the object when it is released by the flexible end effector in pick-and-drop type scenarios.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of manipulating an object held by a flexible end effector of a robot having one or more tactile sensors and one or more curvature sensors positioned at the flexible end effector, the method comprising:
    receiving, by a processing device, tactile data from the one or more tactile sensors;
    receiving, by the processing device, curvature data from the one or more curvature sensors;
    determining, by the processing device, a plurality of segments of the flexible end effector from the curvature data;
    assigning, by the processing device, a frame to each one of the plurality of segments;
    determining, by the processing device; a location of each point of contact between the object and the flexible end effector from the tactile data;
    calculating, by the processing device, a set of relative transformations and determining a location of each point relative to one of the frames;
    generating, by the processing device, continuous data from the determined location of each point of contact between the object and the flexible end effector from the tactile data,
    providing, by the processing device, the continuous data to a pose determination algorithm that uses the continuous data to determine the pose of the object; and
    controlling, by processing device, the robot to manipulate the object based on the determined pose of the object.

2. The method of claim 1, wherein providing the continuous data to a pose determination algorithm comprises feeding the continuous data to an iterative closest point (ICP) algorithm.

3. The method of claim 1, wherein receiving the curvature data comprises receiving information corresponding to a curvature of a plurality of segments of an internal side member of a finger of the flexible end effector.

4. The method of claim 3, wherein calculating the set of relative transformations comprises computing a transformation of a frame relative to transformation $^{F_{i+1}}X_{F_i}$ by obtaining a translation along a curve of one of the plurality of segments of the internal side member by an angle about $\hat{z}$ of $\theta$.

5. The method of claim 4, wherein computing the transformation of the frame is computed as $$^{F_{i+1}}X_{F_i} = \begin{bmatrix} R_z(\theta_i) & ^{F_{i+1}}p_{F_i} \\ 0 & 1 \end{bmatrix}$$

wherein a relative position vector $$^{F_{i+1}}p_{F_i} = \frac{1}{\kappa_i}[1 - \cos(\theta_i), \sin(\theta_i), 0]^T,$$

and $\theta_i = l_i \kappa_i$, and
wherein $\kappa_i$ and $R_z(\theta_i)$ is a rotation matrix representing a rotation about $\hat{z}$ an angle of $\theta_i$.

6. The method of claim 1; wherein determining the location of each point of contact between the object and the flexible end effector comprises determining a location of at least one of the tactile sensors relative to the flexible end effector and determining characteristics of a sensed pressure from the tactile data.

7. The method of claim 1, wherein assigning the frame to each one of the plurality of segments comprises assigning the frame based on one or more inflection points along a curvature of the flexible end effector.

8. A robot comprising:
a flexible end effector comprising one or more flexible fingers, each one of the one or more flexible fingers defined by a flexible internal side member;
one or more curvature sensors positioned to sense a curvature of each one of the one or more flexible fingers and generate curvature data corresponding to the curvature;
one or more tactile sensors positioned adjacent to each one of the one or more flexible fingers, the one or more tactile sensors configured to sense a location of one or more deformations of the flexible internal side member caused by a contact between the flexible end effector and an object held by the flexible end effector and generate tactile data corresponding to the location of the one or more deformations; and
a computing device communicatively coupled to the one or more curvature sensors and the one or more tactile sensors, the computing device programmed to determine the pose of the object held by the flexible end effector by generating continuous data from the curvature data and the tactile data and feeding the continuous data to a pose estimation algorithm.

9. The robot of claim 8, wherein each of the one or more flexible fingers is a finray finger.

10. The robot of claim 8, wherein the one or more curvature sensors comprise a strip of flexible material disposed on a surface of each of the one or more flexible fingers.

11. The robot of claim 10, wherein the strip of flexible material comprises a plurality of curvature sensing segments.

12. The robot of claim 8, wherein:
each of the flexible fingers defines a plurality of finger segments;
the one or more tactile sensors comprises a plurality of tactile sensors; and
at least one of the plurality of tactile sensors is disposed adjacent to each of the plurality of finger segments.

13. The robot of claim 8, wherein each one of the one or more tactile sensors is a force collector type device that uses a force collector to measure an amount of strain or deflection due to an applied force over a measured area.

14. The robot of claim 8, wherein the tactile data comprises a pressure map.

15. The robot of claim 8, wherein the one or more curvature sensors and the one or more tactile sensors are integrated into a single device that generates the curvature data and the tactile data.

16. The robot of claim 8, wherein the computing device comprises a processor and a non-transitory, processor readable storage medium communicatively coupled to the processor, the non-transitory, processor readable storage medium comprising one or more programming instructions thereon that, when executed, cause the processor to:
receive the tactile data from the one or more tactile sensors,
receive the curvature data from the one or more curvature sensors,
determine a plurality of segments of each of the one or more flexible fingers from the curvature data,
assign a frame to each one of the plurality of segments;
determine a location of each point of contact between the object and the one or more flexible fingers from the tactile data,
calculate a set of relative transformations and determine a location of each point relative to one of the frames, and
generate the continuous data from the determined location of each point of contact between the object and the flexible end effector from the tactile data.

17. A robot comprising:
a robot arm comprising a flexible end effector having a plurality of flexible fingers, each one of the plurality of flexible fingers defined by a flexible internal side member;
one or more curvature sensors positioned to sense a curvature of each one of the plurality of flexible fingers and generate curvature data corresponding to the curvature;
one or more tactile sensors positioned adjacent to each one of the plurality of flexible fingers, the one or more tactile sensors configured to sense a location of one or more deformations of the flexible internal side member caused by a contact between the flexible end effector and an object held by the flexible end effector and generate tactile data corresponding to the location of the one or more deformations; and
a computing device communicatively coupled to the one or more curvature sensors and the one or more tactile sensors, the computing device programmed to determine the pose of the object held by the flexible end effector by generating continuous data from the curvature data and the tactile data and feeding the continuous data to a pose estimation algorithm.

18. The robot of claim 17, wherein each of the plurality of flexible fingers is a finray finger.

19. The robot of claim 17, wherein the one or more curvature sensors comprise a strip of flexible material disposed on a surface of each of the plurality of flexible fingers.

20. The robot of claim 17, wherein:
each of the flexible fingers defines a plurality of finger segments;
the one or more tactile sensors comprises a plurality of tactile sensors; and
at least one of the plurality of tactile sensors is disposed adjacent to each of the plurality of finger segments.

* * * * *